United States Patent
Blum

(10) Patent No.: US 10,078,341 B2
(45) Date of Patent: Sep. 18, 2018

(54) SYSTEM AND METHOD WITH GEO LOCATION TRIGGERING AUTOMATIC ACTION

(71) Applicant: Honeywell International Inc., Morristown, NJ (US)

(72) Inventor: William R. Blum, Huntington Station, NY (US)

(73) Assignee: Honeywell International Inc, Morris Plains, NJ (US)

( * ) Notice: Subject to any disclaimer, the term of this patent is extended or adjusted under 35 U.S.C. 154(b) by 425 days.

(21) Appl. No.: 13/860,563

(22) Filed: Apr. 11, 2013

(65) Prior Publication Data
US 2014/0309788 A1    Oct. 16, 2014

(51) Int. Cl.
| | |
|---|---|
| G05D 23/19 | (2006.01) |
| G01S 19/51 | (2010.01) |
| G05B 19/042 | (2006.01) |
| H04W 4/02 | (2018.01) |
| F24F 11/56 | (2018.01) |
| F24F 11/58 | (2018.01) |

(52) U.S. Cl.
CPC .......... *G05D 23/1917* (2013.01); *G01S 19/51* (2013.01); *G05B 19/042* (2013.01); *F24F 11/56* (2018.01); *F24F 11/58* (2018.01); *G05B 2219/23051* (2013.01); *G05B 2219/2614* (2013.01); *G05B 2219/2642* (2013.01); *H04W 4/02* (2013.01)

(58) Field of Classification Search
CPC .......... G05D 23/1917; G05D 23/1905; G05D 23/2204; G05D 23/1919; G01S 19/51
USPC .......................................................... 700/276
See application file for complete search history.

(56) References Cited

U.S. PATENT DOCUMENTS

| | | | | |
|---|---|---|---|---|
| 4,153,874 | A | * | 5/1979 | Kaestner ...................... 324/161 |
| 2007/0271034 | A1 | * | 11/2007 | Perry ............................ 701/209 |
| 2010/0289643 | A1 | * | 11/2010 | Trundle ............... F24F 11/0086 340/545.1 |
| 2011/0202185 | A1 | | 8/2011 | Imes et al. |
| 2011/0218650 | A1 | * | 9/2011 | Crucs ..................... G05B 11/01 700/13 |
| 2011/0231020 | A1 | | 9/2011 | Ramachandran et al. |
| 2011/0238222 | A1 | * | 9/2011 | Nikovski et al. ............. 700/276 |
| 2012/0046859 | A1 | | 2/2012 | Imes et al. |
| 2012/0179547 | A1 | * | 7/2012 | Besore et al. ............. 705/14.58 |

(Continued)

FOREIGN PATENT DOCUMENTS

EP    2 372 263 A2    10/2011

OTHER PUBLICATIONS

European search report from corresponding EP patent application 14162493.2, dated Jun. 9, 2015.

*Primary Examiner* — Thomas C Lee
*Assistant Examiner* — Alan Chu
(74) *Attorney, Agent, or Firm* — Seager Tufte & Wickhem LLP

(57) ABSTRACT

An apparatus a GPS device that tracks a current location of a user relative to a home of the user and a cloud application that tracks the current location of the user via the GPS device, the cloud application estimates a time period required for the user to travel from the current location to the home and upon detecting that the time is less than a threshold value, automatically sends an activating signal to an HVAC unit in the home of the user to activate the unit.

10 Claims, 1 Drawing Sheet

(56) References Cited

U.S. PATENT DOCUMENTS

| | | | |
|---|---|---|---|
| 2012/0305661 A1* | 12/2012 | Malchiondo et al. | 236/44 A |
| 2013/0267253 A1* | 10/2013 | Case | H04W 4/021 455/456.3 |
| 2014/0100699 A1* | 4/2014 | Guidotti | G05D 23/1902 700/276 |
| 2014/0172571 A1* | 6/2014 | Fabrikant et al. | 705/14.58 |
| 2014/0180576 A1* | 6/2014 | LaMarca et al. | 701/465 |

* cited by examiner

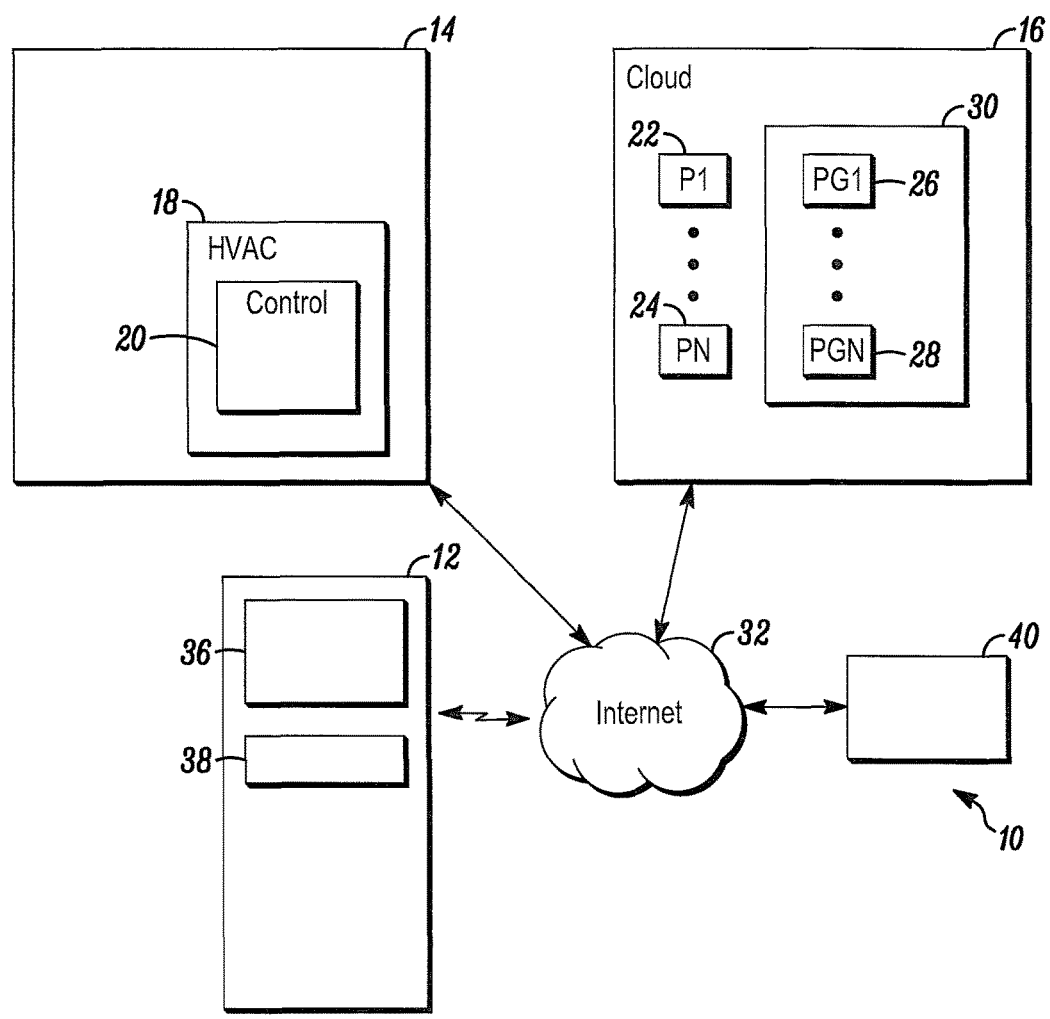

SYSTEM AND METHOD WITH GEO LOCATION TRIGGERING AUTOMATIC ACTION

FIELD

The field of the invention relates to heating, ventilating and air conditioning (HVAC) units and more particularly to methods of controlling such units.

BACKGROUND

The conditioning of the air in residential and commercial buildings is well known. In colder climes, this may include placing one or more heat sources centrally or in each room. The heat source may be a gas or oil burning boiler. Steam pipes may carry steam or heated water to a radiator in each room. Alternatively, the heat source may be a forced air furnace.

In warmer climes, the air within residential or commercial buildings may need to be cooled. This may include the use of a central air conditioner or one or more air conditioners located in each window of the building.

In temperate climates, the conditioning of the air may require both heating and cooling. In the residential context, this is often accomplished centrally by placing an air conditioning evaporator in the ductwork of a forced air heating system.

The ability to condition the air in residential or commercial contexts has dramatically improved the productivity of most people. It can also be used to prolong and improve the quality of life of people at risk (e.g., the sick, the elderly, etc.).

However, the use of heating and air conditioning is expensive and is often unnecessary. For example, during the day many people leave their homes for work or errands. While timers may be used to activate and deactivate such systems, their use requires preprogramming of a return time. Accordingly, a need exists for better methods of controlling such systems.

BRIEF DESCRIPTION OF THE DRAWING

FIG. 1 is a simplified block diagram of an HVAC control system in accordance with an illustrated embodiment.

DETAILED DESCRIPTION OF AN ILLUSTRATED EMBODIMENT

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of an HVAC remote control system 10 shown generally in accordance with an illustrated embodiment. In this regard, the HVAC control system continually tracks the current location of a GPS device 12 carried by a user with respect to a predetermined location (e.g., the home) 14 of the user. Based upon the current location of the user, a cloud application (cloud) 16 estimates a time required for the user to travel from the current location to the home. When the estimated time is less than some predetermined time threshold value, the cloud application automatically sends an activating signal to a controller 20 of a HVAC system 18 within the home activating the system.

The GPS device may be a stand-alone device with a separate radio frequency transceiver that wirelessly exchanges messages with the cloud application via the Internet 32. Alternatively, the GPS device may include apparatus that operates from within a cell or other smart phone. In either case, the GPS device operates by intermittently (e.g., every 20 second, every minute, etc.) determining a current location of the user and transmitting that location to the cloud.

The HVAC system within the home may be a heating system or a cooling system. Alternatively, the HVAC system may include both heating and cooling devices that selectively operate to condition the air within the home depending upon an outside temperature.

The HVAC controller may be a remotely controlled thermostat having an activated state that operates the HVAC system to condition the air within the home and a deactivated state. In this regard, the thermostat may be remotely activated or deactivated via a corresponding message from the cloud.

The cloud application includes one or more processor apparatus (processors) 22, 24 operating under control of one or more computer programs 26, 28 loaded from a non-transitory computer readable medium (memory) 30. As used herein reference to a step or series of steps of a program is also a reference to the processor that executes that step or program. While the programmed processors 22, 24 are shown within the cloud application 16, it should also be understood that the controller 18 and GPS device 12 may also include one or more programmed processors that accomplish the functionality described herein.

In general, the threshold time value used by the cloud application to activate the HVAC system is based upon the HVAC operating time required to heat or cool the home to some corrected (i.e., desired) temperature and/or humidity. For example, on a day where the temperature outside is ninety degree Fahrenheit (90° F.) and the temperature inside the home is also 90° F., then the correction time needed to cool the home to a desired temperature of 75° F. would be much longer than if the inside of the home were only 80° F.

In order to accommodate the HVAC operating time needed to bring the temperature within the home to a desired value, a temperature processor within the controller of the HVAC system may periodically send a current conditions message to the cloud application. The current conditions message may include a temperature inside the home, the temperature outside and a set of heating and cooling coefficient indicating the rate (e.g., the number of degrees per hour) at which the HVAC system is able to raise or lower the temperature inside the home. Upon receipt of the current conditions message, a threshold processor within the cloud may determine a threshold time period that is needed for the HVAC system to correct (raise or lower) the temperature inside the home to achieve the appropriate comfort level.

The estimated time required by the user to travel from the user's current location to the home may be based upon any of a number of different criteria and/or other considerations. Under one preferred embodiment, a distance processor may retrieve a set of coordinates of the user's current location and compare those coordinates with a set of stored coordinates of the home. The distance processor may then calculate a distance to the home based upon the differences in those coordinates.

With the calculated distance, an estimation processor may provide a value of the estimated time by estimating a speed of travel between the current location and the home. The estimated travel speed may be based upon statistical values or upon a fixed, default value entered by the user.

In order to enter a fixed value of the estimated travel speed, the user may use a cursor on a display 36 or a keyboard 38 of the GPS device to first select an icon of the HVAC remote control system on the display. The user may then select "settings" and then "travel speed" from one or more drop down menus on the display to access a travel speed processor of the HVAC control system within the cloud. The travel speed processor may then provide an interactive window on the display 36 through which the user may enter a fixed travel speed. The entered value of the travel speed may be saved in a memory of the cloud.

From the entered value of the fixed travel speed, the travel speed processor may then provide a value for the estimated travel time from the current location to the home by dividing the calculated distance by the fixed travel speed.

During normal use, the estimation processor may continually update the estimated travel time based upon the current location and estimated speed of travel. As each new estimated time is determined, a comparison processor may compare the estimated travel time with the then-current predetermined threshold time period. If the estimated travel time exceeds the threshold value, the estimation processor sends a command to the controller activating the HVAC system.

Under another illustrated embodiment, the estimated travel time may be based upon historical locations of the user. In this case, a tracking processing within the cloud may track the user over some time period (e.g., a day, a month, 6 months, etc.). From the tracked locations, the tracking processor may identify one or more locations frequented by the user (e.g., a place of employment, nearby grocery store, post office, etc.). The frequented locations may be identified by any of a number of criteria (e.g., relative number of times visited per time period, length of stay, etc.)

The tracking processor may also identify one or more respective routes from each of these predetermined locations to the home. For each of these routes, the tracking processor may estimate the travel speed from each of these predetermined locations to the home based upon the real time tracking of the progress of the user along those routes (or portions of those routes) from the predetermined locations to the home. The estimated travel speed along the routes may include one or more values based upon time of day (e.g., rush hour, early morning, night time, etc.). Each of these routes may be saved into a respective file based upon an identifier of the route, time of day, the starting point, etc.

In this case, the location processor may first collect a current location of the user. A matching processor may then attempt to match the current location with one of the predetermined locations or with a location along one of the probable routes to the home. Where the current location matches one of the predetermined locations or a location along one of the respective routes, the estimation processor may then search for a travel time along that route that most closely matches the time of day of the user from the current location to the home. From the current location and route, the estimation processor is able to estimate the travel time from the current location to the home. As above, when the estimated travel time exceeds the threshold value for correction of the temperature in the home, the cloud sends an activation message to the HVAC system.

In another preferred embodiment, an adjustment processor of the cloud retrieves traffic and weather reports from a news service 40. Where a weather portion of the reports indicate inclement weather, the estimated travel time may be increased proportionately. Similarly, where a traffic report is coincident with all or a portion of one of the predetermined routes, the travel time estimate may be adjusted in accordance with the report.

In another preferred embodiment, the travel processor may also operate to deactivate the HVAC system. In this case, the remote HVAC control operates to detect the user leaving the home and, in response, sends a deactivation message to the controller of the HVAC system. The deactivation message may be sent based upon the user exceeding a predetermined distance from the home or upon a distance and a time outside of the home.

In general, the system includes a GPS device that tracks a current location of a user relative to a home of the user and a cloud application that tracks the current location of the user via the GPS device, the cloud application estimates a time period required for the user to travel from the current location to the home and upon detecting that the time is less than a threshold value, automatically sends an activating signal to an HVAC unit in the home of the user to activate the unit. In another embodiment, the system includes a GPS device that tracks a current location of a user relative to a home of the user and a cloud application that estimates a travel time of the user from the current location to the home and activates an HVAC system in the home of the user upon detecting that the estimated travel time exceeds a threshold value. In still another embodiment, the system includes a smart phone with a GPS feature that tracks a current location of a user relative to a home of the user, a distance processor that calculates a distance from the current location to the home, an estimation processor that estimates a travel time from the current location to the home and a comparison processor that compares the estimated travel time with a threshold time for an HVAC system in the home of the user to correct an air temperature within the home to some desired temperature and, upon detecting that the estimated travel time exceeds the threshold time, activates the HVAC system.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus comprising:
   a GPS device that tracks a current location of a user relative to a home of the user;
   an HVAC unit in the home; and
   a cloud application;
   wherein the HVAC unit is configured to send a current conditions message to the cloud application, the current conditions message including a temperature inside the home and a set of heating and/or cooling coefficients indicating a rate at which the HVAC unit is able to raise or lower the temperature inside the home to a desired temperature;
   wherein the GPS device is configured to estimate a time period required for the user to travel to the home, wherein, in response to detecting that the time period required for the user to travel to the home is less than a threshold value, the GPS device is configured to instruct the cloud application to send an activating signal to the HVAC unit in the home to activate the HVAC unit;

wherein the threshold value is calculated by the cloud application based at least in part on the current conditions message received from the HVAC unit, and wherein the cloud application is configured to send the threshold value to the GPS device so that the GPS device can determine whether the time period required for the user to travel to the home is less than the threshold value.

2. The apparatus as in claim 1 wherein the GPS device comprises a smartphone.

3. The apparatus as in claim 1 wherein the GPS device estimates the time period required for the user to travel to the home by determining a distance between the current location and the home and estimating a travel speed of the user between the current location and the home.

4. The apparatus as in claim 3 wherein the GPS device retrieves traffic reports and estimates the travel speed based upon the traffic reports.

5. An apparatus comprising:
a GPS device that tracks a current location of a user relative to a home of the user;
an HVAC unit in the home;
a cloud application;
wherein the HVAC unit sends a current conditions message to the cloud application, the current conditions message including a temperature inside the home and a set of heating and/or cooling coefficients indicating a rate at which the HVAC unit is able to raise or lower the temperature inside the home to a desired temperature;
wherein the GPS device is configured to estimate a travel time of the user to the home, and to instruct the cloud application to activate the HVAC unit in the home of the user in response to detecting that the travel time falls below a threshold value; and
wherein the threshold value is calculated by the cloud application based at least in part upon the temperature inside the home and the set of heating and cooling coefficients indicating the rate at which the HVAC unit is able to raise or lower the temperature inside the home to the desired temperature, and wherein the cloud application is configured to send the threshold value to the GPS device so that the GPS device can detect when the travel time of the user to the home falls below the threshold value.

6. The apparatus as in claim 5 wherein the travel time of the user to the home is estimated based at least in part upon a fixed speed provided by the user.

7. The apparatus as in claim 5 wherein the GPS device adjusts the estimated travel time based upon a weather report.

8. The apparatus as in claim 5 wherein the GPS device adjusts the estimated travel time based at least in part upon a reported travel time from a traffic report.

9. An apparatus comprising:
a cloud application;
a smart phone with a GPS feature that tracks a current location of a user relative to a home of the user;
an HVAC unit in the home of the user;
the smart phone is configured to determine a distance from the current location to the home, and based at least part on the determined distance, the smart phone is configured to estimate a travel time to the home;
wherein the HVAC unit is configured to send a current conditions message to the cloud application, the current conditions message including a set of heating and/or cooling coefficients indicating a rate at which the HVAC unit is able to raise or lower a current temperature inside the home to a desired temperature; and
wherein the smart phone is configured to compare the travel time with a threshold time, wherein the threshold time is determined by the cloud application based at least in part on the current conditions message received from the HVAC unit and is sent to the smart phone.

10. The apparatus as in claim 9 wherein the smart phone is configured to adjust the travel time based upon weather and/or traffic reports.

* * * * *